(12) United States Patent
Tomotoshi et al.

(10) Patent No.: US 12,026,341 B2
(45) Date of Patent: Jul. 2, 2024

(54) IMAGE PROCESSING METHOD AND IMAGE PROCESSING DEVICE

(71) Applicant: SEIKO EPSON CORPORATION, Tokyo (JP)

(72) Inventors: Akio Tomotoshi, Sapporo (JP); Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 92 days.

(21) Appl. No.: 17/835,085

(22) Filed: Jun. 8, 2022

(65) Prior Publication Data

US 2022/0397977 A1 Dec. 15, 2022

(30) Foreign Application Priority Data

Jun. 9, 2021 (JP) .................................. 2021-096399
Jul. 16, 2021 (JP) .................................. 2021-117684

(51) Int. Cl.
*G06F 3/038* (2013.01)
*G06F 3/0354* (2013.01)
*G06F 3/042* (2006.01)

(52) U.S. Cl.
CPC ........ *G06F 3/0425* (2013.01); *G06F 3/03545* (2013.01); *G06F 3/038* (2013.01)

(58) Field of Classification Search
CPC ............... G06F 3/03542; G06F 3/0425; G06F 3/04845; G06F 3/04883; G06F 3/038; G06F 3/04842; G06F 3/0386; G06F 1/1639; G06T 11/60; G09G 2340/12; G09G 2340/0464; G09G 2354/00; G09G 5/377
See application file for complete search history.

(56) References Cited

U.S. PATENT DOCUMENTS

2015/0154777 A1* 6/2015 Ozawa ................ G06F 3/04845
                                                            345/629
2016/0260410 A1* 9/2016 Fujimori ............... G06T 11/203

FOREIGN PATENT DOCUMENTS

| JP | 2013-250805 A | 12/2013 |
| JP | 2017-049904 A | 3/2017 |
| JP | 2018-163684 A | 10/2018 |
| JP | 2019-023888 A | 2/2019 |
| JP | 2020-149336 A | 9/2020 |

* cited by examiner

*Primary Examiner* — Hau H Nguyen
(74) *Attorney, Agent, or Firm* — Oliff PLC (57) ABSTRACT

An image processing method includes detecting pointer contact positions trajectories on a display surface, displaying a first image on the display surface, displaying a second image having first and second portions on the display surface using the first image as a background, moving a second image display position on the display surface along the pointer trajectory when a pointer trajectory starting point is included in a display surface area on which the second image is displayed, providing a drawing effect to a first image portion overlapping a second image trajectory when the starting point is included in an area in which the first portion is displayed in the moving the second image display position, and keeping the first image portion display overlapping the second image trajectory when the starting point is included in an area in which the second portion is displayed in the moving the second image display position.

7 Claims, 9 Drawing Sheets

IMAGE PROCESSING METHOD AND IMAGE PROCESSING DEVICE

The present application is based on, and claims priority from JP Application Serial Number 2021-096399, filed Jun. 9, 2021, and JP Application Serial Number 2021-117684, filed Jul. 16, 2021 the disclosure of which are hereby incorporated by reference herein in its entirety.

BACKGROUND

1. Technical Field

The present disclosure relates to an image processing method and an image processing device.

2. Related Art

In the past, some devices for displaying a drawn image based on a drawing input from a user have been equipped with an eraser function for erasing the drawing. For example, in JP-A-2018-163684, there is described an information processing device which displays a drawn image based on a trajectory of a touch input from the user on a display screen. When an eraser button in a toolbar is touched, the information processing device displays an eraser cursor on the display screen. When the user moves the eraser cursor, an area in the drawn image overlapping the trajectory of the eraser cursor is erased.

In the related art described above, when the user wants to use the eraser function, the user is required to touch the toolbar. When the user repeats erasure with the eraser and the drawing input, it is necessary for the user to operate the toolbar occasionally, and therefore, there is a problem that the operation is cumbersome. Further, besides the erasure of the drawn image, there is room for improvement in terms of workability in a method of invoking a function using the toolbar.

SUMMARY

An image processing method according to an aspect of the present disclosure includes the steps of detecting a trajectory of a contact position of a pointer on a display surface in a period from when the pointer makes contact with the display surface to when the pointer is separated from the display surface, displaying a first image on the display surface, displaying a second image having a first portion and a second portion on the display surface using the first image as a background, moving a display position of the second image on the display surface along the trajectory of the contact position when a starting point of the trajectory of the contact position is included in an area of the display surface in which the second image is displayed, providing a drawing effect to a portion of the first image overlapping a movement trajectory of the second image when the starting point is included in an area in which the first portion is displayed in the moving of the display position of the second image, and keeping display of the portion of the first image overlapping the movement trajectory of the second image when the starting point is included in an area in which the second portion is displayed in the moving of the display position of the second image.

An image processing device according to an aspect of the present disclosure includes a display device, a detection device configured to detect information related to a position of a pointer, and at least one processing device, wherein the processing device executes the steps of detecting a trajectory of a contact position of the pointer on a display surface in a period from when the pointer makes contact with the display surface to when the pointer is separated from the display surface based on an output of the detection device, displaying a first image on the display surface using the display device, displaying a second image having a first portion and a second portion on the display surface using the first image as a background using the display device, moving a display position of the second image on the display surface along the trajectory of the contact position when a starting point of the trajectory of the contact position is included in an area of the display surface in which the second image is displayed, providing a drawing effect to a portion of the first image overlapping a movement trajectory of the second image when the starting point is included in an area in which the first portion is displayed during the movement of the display position of the second image, and keeping display of the portion of the first image overlapping the movement trajectory of the second image when the starting point is located in an area in which the second portion is displayed in the moving of the display position of the second image.

DESCRIPTION OF AN EXEMPLARY EMBODIMENT

A preferred embodiment of the present disclosure will hereinafter be described with reference to the accompanying drawings. It should be noted that in the drawings, the dimension of the scale size of each section is arbitrarily different from the reality, and some portions are shown schematically in order to make understanding easy. Further, the scope or the spirit of the present disclosure is not limited to the embodiment unless there is a particular description of limiting the present disclosure in the following explanation.

A: General Configuration of Projector System 1

Figure 1:
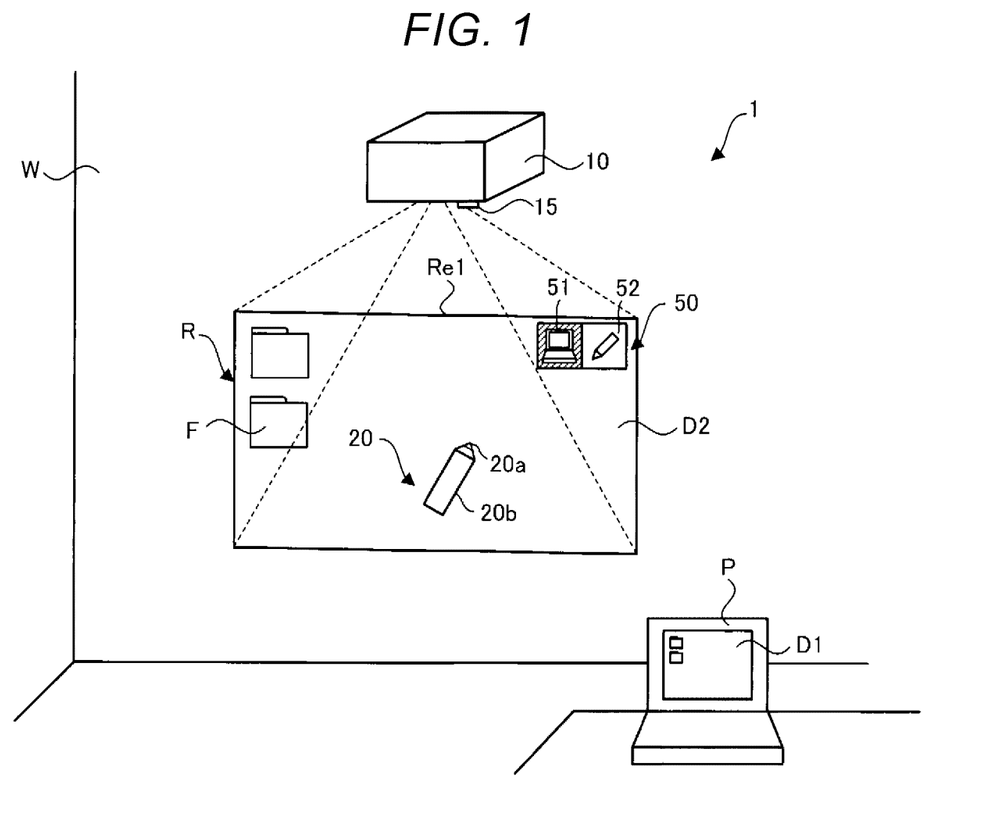
FIG. 1 is a diagram showing a projector system including a projector according to an embodiment.

FIG. 1 is a diagram showing a projector system 1 including a projector 10 according to the embodiment. The projector system 1 includes the projector 10 and a pointer 20.

The projector 10 is installed in a portion of a wall W located above an upper end Re1 of a projection area R. The projector 10 can be installed on, for example, a desk, a table, or the floor, or can also be suspended from the ceiling instead of being installed on the wall W. In the present embodiment, the projection area R is, for example, a part of the wall W. The projection area R can be a screen, a door, a whiteboard, or the like besides the part of the wall W. The projection area R is an example of a display surface.

The projector 10 projects an image on the projection area R to thereby display the image in the projection area R. The projector 10 is an example of a display device. The display device is not limited to the projector 10, but can also be a display such as an FPD (Flat Panel Display). The FPD is, for example, a liquid crystal display, a plasma display, or an organic EL (Electro Luminescence) display.

The pointer 20 is, for example, a pen-type pointing tool. The shape of the pointer 20 is not limited to the pen-like shape, and can also be, for example, a circular cylinder, a prismatic column, a circular cone, or a pyramidal shape. The user grips, for example, a shaft 20b of the pointer 20, and translates the pointer 20 on the projection area R while making a tip 20a have contact with the projection area R.

The projector 10 images the projection area R with a camera 15 to thereby generate an imaging datum. The projector 10 analyzes the imaging datum to thereby identify a position of the pointer 20. As described later, in the present embodiment, a position where the infrared light emitted from a first light source 23 of the pointer 20 has been detected on an infrared light imaging datum is assumed to be a contact position where the tip 20a of the pointer 20 has contact with the projection area R.

The projector 10 displays an image representing icons which can be selected by the pointer 20 in the projection area R. In FIG. 1, there is displayed a mode selector 50 for designating an operation mode of the projector 10. The mode selector 50 includes a PC mode icon 51 in which an illustration of a personal computer (PC) is drawn, and a drawing mode icon 52 in which an illustration of a pen is drawn.

In the state in which the PC mode icon 51 is selected, the projector 10 operates in a PC mode. The PC mode means a mode in which data in a computer P coupled to the projector 10 are displayed in the projection area R, and the operation of the computer P is made possible by an operation on the projection area R. FIG. 1 shows a state in which the PC mode icon 51 is selected. In the projection area R, there is displayed a projection desktop screen D2 for displaying a desktop screen D1 of the computer P. For example, when quickly touching a folder icon F on the projection desktop screen D2 two times with the pointer 20, window display in which a folder in the computer P corresponding to the folder icon F is displayed in the projection area R. The projector 10 and the computer P are connected to each other with, for example, near field communication described later.

In contrast, in the state in which the drawing mode icon 52 is selected, the projector 10 operates in a drawing mode. Although the details will be described later, in the drawing mode, when the user moves the pointer 20 on the projection area R, the projector 10 projects the drawn image 70 including a line DL corresponding to a trajectory of the pointer 20 on the projection area R. In the drawing mode, the pointer 20 functions as a pen for designating a drawing position.

The mode selector 50 can continuously be displayed in the projection area R, or can be stopped being displayed in the projection area R when, for example, an operation on the mode selector 50 does not occur in a certain period of time. In the present embodiment, the latter is adopted. In the case of the latter, it is possible to resume to display the mode selector 50 in accordance with, for example, an operation on the operator 12 of the projector 10 described later.

B: Configuration of Pointer 20

Figure 2:
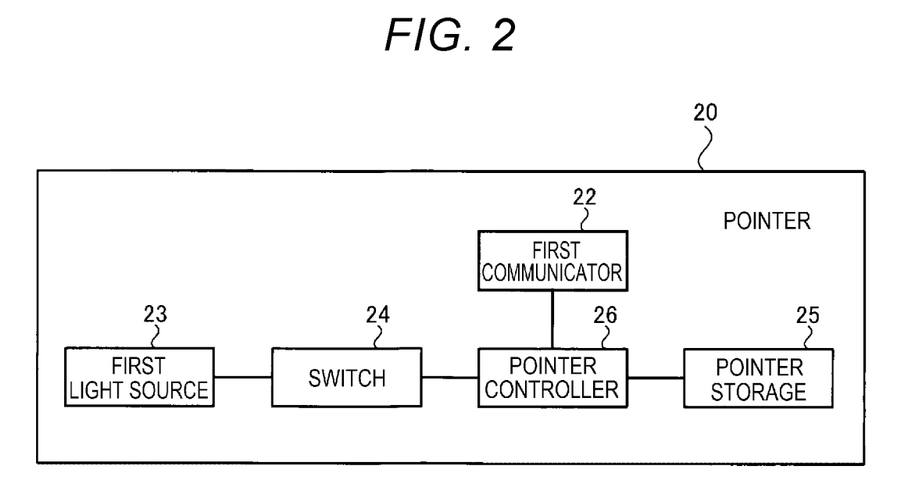
FIG. 2 is a diagram showing an example of a configuration of a pointer.

FIG. 2 is a diagram showing an example of a configuration of the pointer 20. The pointer 20 includes a first communicator 22, a first light source 23, a switch 24, a pointer storage 25, and a pointer controller 26.

The first communicator 22 has a communication circuit, an antenna, and so on, and performs wireless communication with the projector 10 using Bluetooth. Bluetooth is a registered trademark. Bluetooth is an example of a near field wireless communication system. The near field wireless communication system is not limited to Bluetooth, but can also be, for example, Wi-Fi. Wi-Fi is a registered trademark. The communication system of the wireless communication between the first communicator 22 and the projector 10 is not limited to the near field wireless communication system, but can also be other communication systems. It should be noted that when the first communicator 22 performs wired communication, the first communicator 22 has a communication circuit, a connector to which communicating lines are coupled, and so on.

The first light source 23 is an LED (Light Emitting Diode) for emitting infrared light. The first light source 23 is not limited to the LED, but can also be, for example, an LD (Laser Diode) for emitting the infrared light. The first light source 23 emits the infrared light for making the projector 10 recognize the contact position of the pointer 20.

The switch 24 turns ON when pressure acts on the tip 20a of the pointer 20, and turns OFF when the pressure acting on the tip 20a is released. The switch 24 functions as a sensor for detecting whether or not the tip 20a has contact with the projection area R. The first light source 23 turns ON and OFF in tandem with the switch 24 turning ON and OFF. In other words, when the pressure acts on the tip 20a of the pointer 20, the switch 24 turns ON, and the first light source 23 emits light. Further, when the pressure acting on the tip 20a is released, the switch 24 turns OFF, and the first light source 23 stops emitting light.

The pointer storage 25 is a nonvolatile semiconductor memory such as a flash memory. The pointer storage 25 stores a control program to be executed by the pointer controller 26.

The pointer controller 26 is constituted by, for example, a single processor, or a plurality of processors. Citing an example, the pointer controller 26 is formed of a signal CPU (Central Processing Unit) or a plurality of CPUs. Some or all of the functions of the pointer controller 26 can also be configured by a circuit such as a DSP (Digital Signal Processor), an ASIC (Application Specific Integrated Circuit), a PLD (Programmable Logic Device), or an FPGA (Field Programmable Gate Array). The pointer controller 26 executes a plurality of types of processing in parallel or in sequence.

The pointer controller 26 executes the control program stored in the pointer storage 25 to thereby realize a variety of functions. For example, in the circumstance in which the switch 24 is in an ON state, the pointer controller 26 puts the first light source 23 ON when the first communicator 22 receives a sync signal from the projector 10. The sync signal is a signal for synchronizing a lighting timing of the first light source 23 with an imaging timing of the camera 15.

C: Configuration of Projector 10

Figure 3:
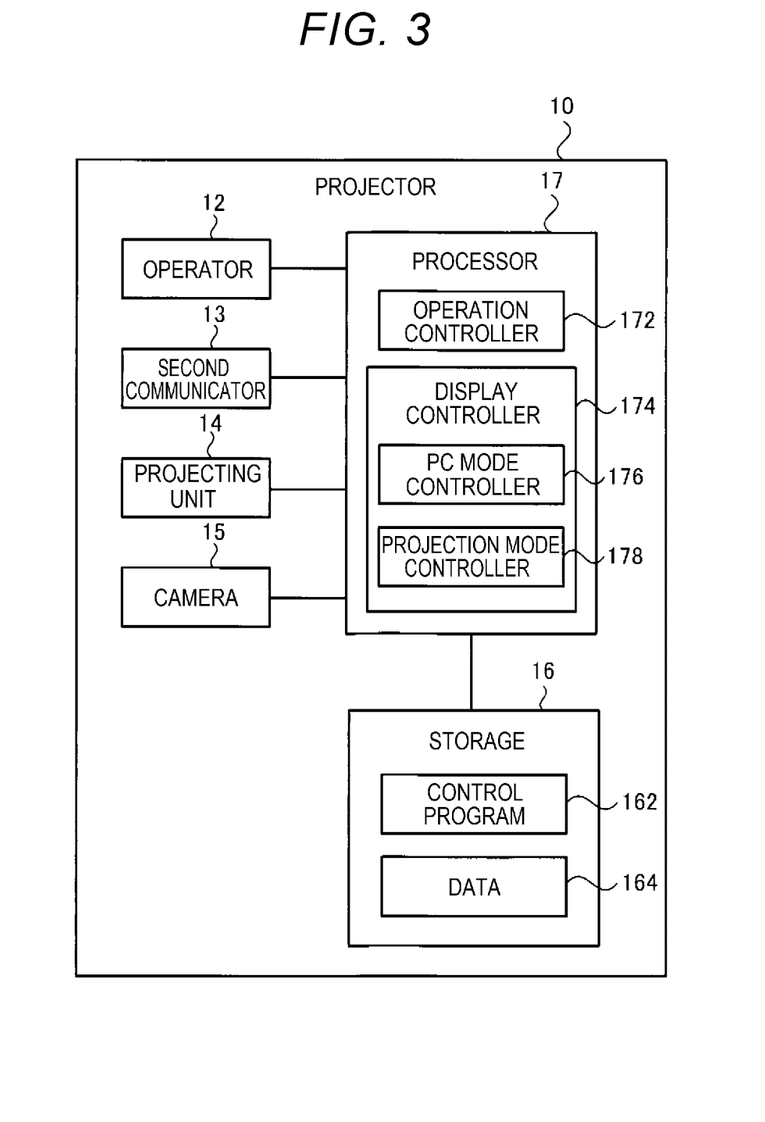
FIG. 3 is a diagram showing an example of a configuration of the projector.

FIG. 3 is a diagram showing an example of a configuration of the projector 10. The projector 10 includes an operator 12, a second communicator 13, a projecting unit 14, a camera 15, a storage 16, and a processor 17.

The operator 12 is formed of, for example, a variety of operating buttons, operating keys, or a touch panel. The operator 12 is provided to, for example, a chassis of the projector 10. Further, the operator 12 can be a remote controller disposed separately from the chassis of the projector 10. The operator 12 receives an input operation from the user.

The second communicator 13 has a communication circuit, an antenna, and so on, and performs the wireless communication with the first communicator 22 of the pointer 20 using Bluetooth. As described above, the communication system for the wireless communication is not limited to Bluetooth, but can also be, for example, Wi-Fi. It should be noted that when the second communicator 13 performs wired communication, a communication circuit, a connector to which communicating lines are coupled, and so on are provided.

The projecting unit 14 projects an image on the projection area R to thereby display the image in the projection area R. The projecting unit 14 is an example of a display device, and is provided with an image processing circuit, a frame memory, a liquid crystal light valve, a light valve drive circuit, a light source, a projection optical system, and so on. When the image processing circuit receives an image datum from an image supply device such as the processor 17 or the computer P, the image processing circuit develops the image datum in the frame memory, and then performs necessary image processing. This image processing is, for example, processing of converting the resolution of the image datum into the resolution of the liquid crystal valve, a geometric correction process for resolving a keystone distortion, or the like. The image datum on which the image processing has been performed is converted into an image signal, and by the liquid crystal light valve and so on being driven based on the image signal, the image datum is projected on the projection area R as the image. It should be noted that as the projecting unit 14, it is possible to adopt, for example, a DLP (Digital Lighting Processing) system besides the liquid crystal system using the liquid crystal light valve and so on described above. DLP is a registered trademark.

The camera 15 images the projection area R to thereby generate the imaging datum. The camera 15 includes a light receiving optical system such as a lens, an imaging element for converting the light collected by the light receiving optical system into an electric signal, and so on. The imaging element is a CCD (Charge Coupled Device) image sensor for receiving the light in, for example, an infrared region or a visible light region. The camera 15 can also be provided with a filter for blocking a part of the light entering the imaging element. For example, in the camera 15, when making the imaging element receive the infrared light, the filter for mainly transmitting the light in the infrared region is disposed in front of the imaging element.

The camera 15 can be disposed as a separate member from the projector 10. In this case, the camera 15 and the projector 10 can be connected to each other with a wired or wireless interface so as to be able to perform transmission/reception of data.

When the camera 15 performs imaging with the visible light, there is taken, for example, the image projected by the projecting unit 14 on the projection area R. The imaging datum generated by the camera 15 performing imaging with the visible light is hereinafter referred to as a "visible light imaging datum." The visible light imaging datum is used in, for example, a calibration described later.

When the camera 15 performs imaging with the infrared light, there is generated, for example, the imaging datum representing the infrared light emitted by the pointer 20. The imaging datum generated by imaging by the camera 15 with the infrared light is hereinafter referred to as "infrared light imaging datum." The infrared light imaging datum is used for detecting, for example, the contact position of the pointer 20 on the projection area R. In other words, the camera 15 is an example of a detection device for detecting information related to the position of the pointer 20.

The storage 16 is a recording medium which can be read by the processor 17. The storage 16 includes, for example, a nonvolatile memory and a volatile memory. As the nonvolatile memory, there can be cited, for example, a ROM (Read Only Memory), an EPROM (Erasable Programmable Read Only Memory), and an EEPROM (Electrically Erasable Programmable Read Only Memory). As the volatile memory, there can be cited, for example, a RAM.

The storage 16 stores a control program 162 to be executed by the processor 17, a variety of types of data 164 to be used by the processor 17.

The control program 162 is executed by the processor 17. The control program 162 includes an operating system and a plurality of application programs. The plurality of application programs includes an application program for realizing an interactive function.

The data 164 include data representing processing conditions of a variety of types of processing to be executed by the processor 17. Further, the data 164 can also include data to be used in the image processing. Further, the data 164 include a calibration image datum representing a calibration image. In the calibration image, there are arranged marks having shapes set in advance at intervals.

The processor 17 is an example of the processing device, and is constituted by, for example, a single processor, or a plurality of processors. Citing an example, the processor 17 is constituted by a signal CPU or a plurality of CPUs. Some or all of the functions of the processor 17 can be configured by a circuit such as a DSP, an ASIC, a PLD, or an FPGA. The processor 17 executes a plurality of types of processing in parallel or in sequence.

The processor 17 retrieves the control program 162 from the storage 16 and then executes the control program 162 to thereby function as an operation controller 172, a display controller 174, a PC mode controller 176, and a drawing mode controller 178.

The operation controller 172 controls a variety of operations of the projector 10. The operation controller 172 executes, for example, the calibration. The calibration is processing of making a coordinate on the frame memory of the projecting unit 14 and a coordinate on the imaging datum correspond to each other. The coordinate on the frame memory corresponds to a position on the image to be projected on the projection area R. By the position on the frame memory and the position on the imaging datum being made to correspond to each other, it is possible to identify a portion corresponding to the contact position of the pointer 20 on the projection area R in, for example, the image to be projected on the projection area R. The operation controller 172 executes the calibration to thereby generate the calibration datum for making the coordinate on the imaging datum by the camera 15 and the coordinate on the frame memory of the projecting unit 14 correspond to each other, and then store the calibration datum in the storage 16.

Besides the above, the operation controller 172 establishes the communication between, for example, the pointer 20 and the second communicator 13. Further, after completing the calibration, the operation controller 172 makes the camera 15 perform imaging with the infrared light at constant time intervals to generate the infrared light imaging datum. Further, the operation controller 172 transmits the sync signal from the second communicator 13 to the pointer 20 in sync with the imaging timing of the camera 15.

The display controller 174 controls the image to be projected by the projecting unit 14. The display controller 174 includes the PC mode controller 176 and the drawing mode controller 178.

The PC mode controller 176 controls the display image in the projection area R when the PC mode icon 51 is selected, namely when the PC mode is designated. Further, the PC mode controller 176 performs, for example, establishment of the communication with the computer P and transmission/reception of data.

The drawing mode controller 178 controls the display image in the projection area R when the drawing mode icon 52 is selected, namely when the drawing mode is designated. The drawing mode controller 178 receives the drawing operation using the pointer 20 from, for example, the user, and then displays the drawn image corresponding to the drawing operation in the projection area R.

D: Details of Drawing Mode

Figure 4:
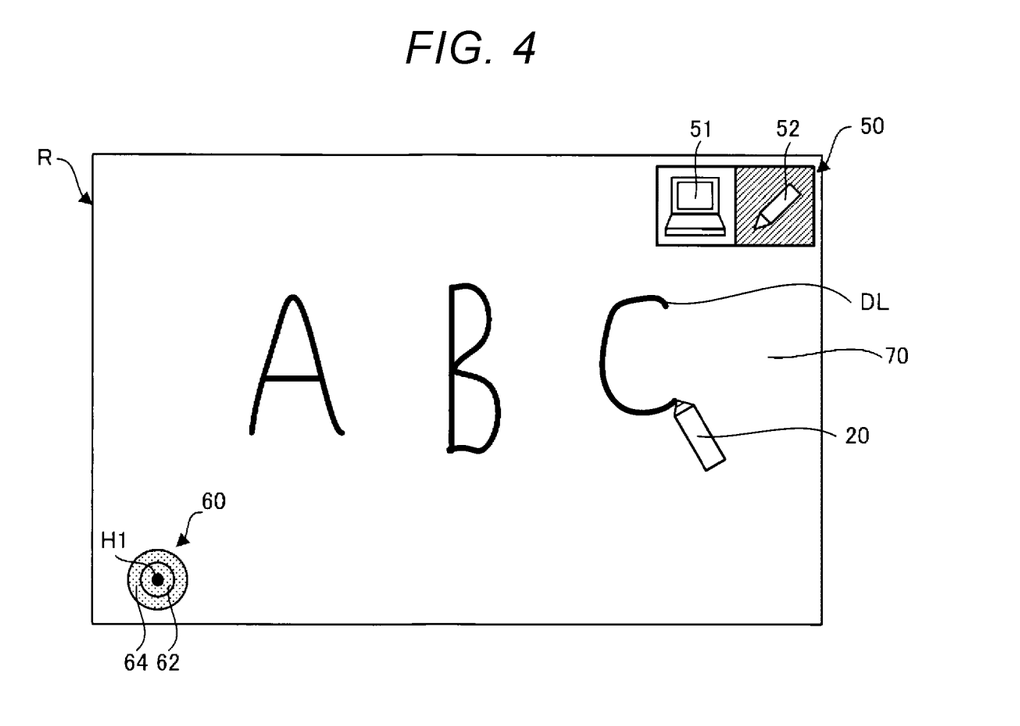
FIG. 4 is a diagram showing an example of display in a projection area when selecting a drawing mode.

FIG. 4 is a diagram showing an example of display in the projection area R when selecting the drawing mode. In FIG. 4, in the projection area R, there are displayed the mode selector 50 in the state in which the drawing mode icon 52 is selected, the drawn image 70 including drawn lines DL, and an eraser icon 60. A reference symbol H1 represents a position of a central point O of the eraser icon 60. In the following description, the display position of the eraser icon 60 means the position of the central point O of the eraser icon 60 in the projection area R. Further, the display area of the eraser icon 60 means an area in which the eraser icon 60 is displayed in the projection area R. The drawn image 70 is an image including the drawn lines DL representing movement trajectory obtained by the user moving the pointer 20 while having contact with the projection area R. In the example shown in FIG. 4, "ABC" is drawn in the drawn image 70. The drawn image 70 is an example of a first image. The eraser icon 60 is an example of a second image.

D-1: Eraser Icon 60

The eraser icon 60 is a tool to be used when the user erases an arbitrary area in the drawn image 70. In the present embodiment, the eraser icon 60 is always displayed in the projection area R during a designation of the drawing mode. In other words, in the present embodiment, the eraser icon 60 continues to be displayed in the projection area R in the drawing mode in which the trajectory of the contact position of the pointer 20 is displayed as the drawn image 70. Therefore, it is possible for the user to promptly use the eraser icon 60 as needed without performing, for example, an operation for instructing a start of display of the eraser icon 60, and thus, it is possible to enhance the convenience in the drawing operation.

Figure 6A:
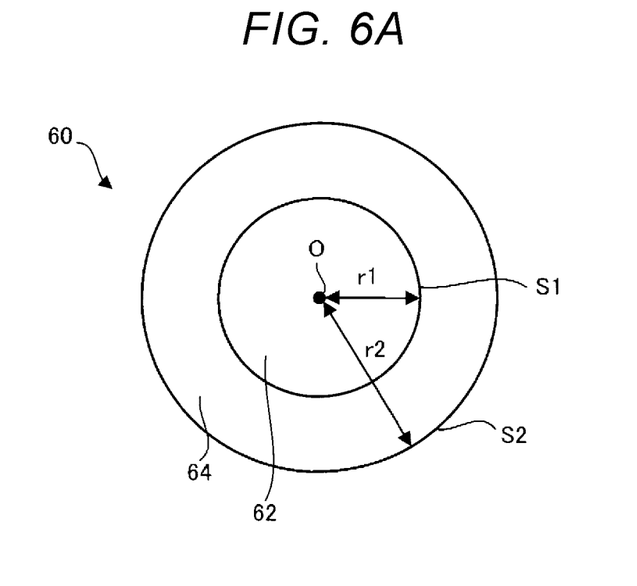
FIG. 6A is an enlarged view of an eraser icon related to the embodiment.

FIG. 6A is an enlarged view of an eraser icon 60 related to the present embodiment. The eraser icon 60 has a first portion 62 and a second portion 64. In the present embodiment, the eraser icon 60 presents a circular shape as a whole. The first portion 62 is a circular area surrounded by a first circle S1 having a radius r1. Further, the second portion 64 is an area shaped like a doughnut surrounded by the first circle S1 and a second circle S2 which has a radius r2 larger than the radius r1 of the first circle S1, and has the central point O in common with the first circle S1. In other words, in the eraser icon 60, an outer edge of the first portion 62 is surrounded by the second portion 64. It should be noted that in the present embodiment, the second portion 64 is arranged at an outer side of the eraser icon 60, and the first portion 62 is arranged at an inner side thereof, but it is possible to arrange, for example, the first portion 62 at the outer side of the eraser icon 60, and the second portion 64 at the inner side thereof. In other words, in the eraser icon 60, it is possible to adopt a configuration in which the outer edge of the second portion 64 is surrounded by the first portion 62.

As described later, when the tip 20a of the pointer 20 touches the display area of the eraser icon 60, there is established a state in which the eraser icon 60 is selected. When the pointer 20 moves in the state in which the eraser icon 60 is selected, the eraser icon 60 also moves in accordance with the movement of the pointer 20. On this occasion, presence or absence of the drawn line DL differs by whether the contact position of the pointer 20 on the eraser icon 60 is located in the first portion 62 or the second portion 64. When the pointer 20 is located in the first portion 62, a portion of the drawn image 70 overlapping the eraser icon 60 is erased. In contrast, when the pointer 20 is located in the second portion 64, the portion of the drawn image 70 overlapping the eraser icon 60 remains unerased.

Figure 6B:
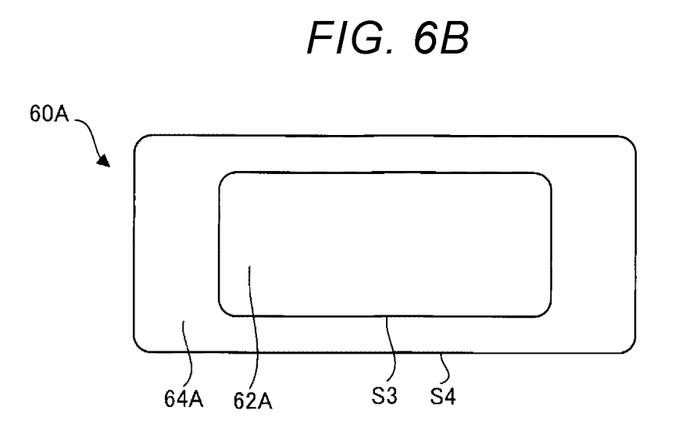
FIG. 6B is a diagram showing another example of the eraser icon.

It should be noted that the shape of the eraser icon 60 is not limited to the circular shape, and a variety of shapes can be applied. FIG. 6B is an enlarged view showing another example of the eraser icon 60. An eraser icon 60A shown in FIG. 6B presents a rectangular shape with rounded corners as a whole. A first portion 62A is an area surrounded by a first rectangle S3 surrounded by a pair of short sides opposed to each other and a pair of long sides opposed to each other. Further, the second portion 64A is an area shaped like a rectangular frame surrounded by the first rectangle S3 and a second rectangle S4 having short sides longer than the short sides of the first rectangle S3, and long sides longer than the long sides of the first rectangle S3. The eraser icon 60A having such a shape evokes an eraser for a whiteboard or a blackboard. It is possible for the user to intuitively figure out the use application of the icon.

Figure 5:
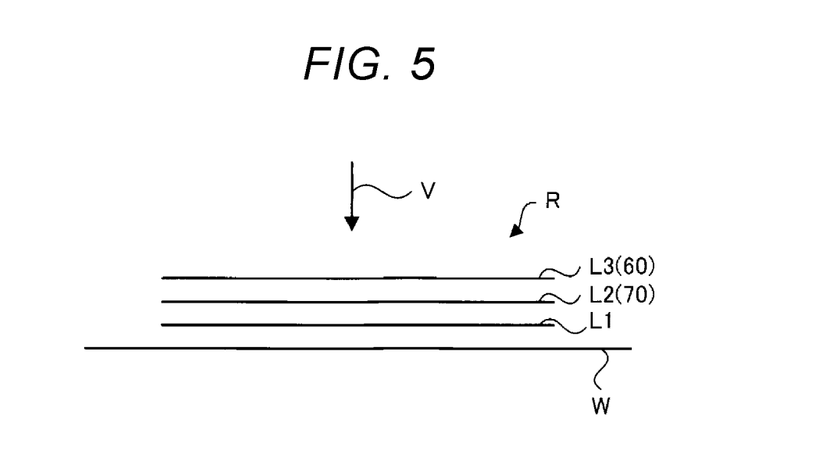
FIG. 5 is a diagram schematically showing a layer arrangement in a projection image.

FIG. 5 is a diagram schematically showing a layer arrangement in a projection image to be projected on the projection area R. When defining a layer close to the wall W as a lower layer, there are stacked a first layer L1 including a background image, a second layer L2 including the drawn image 70, and a third layer L3 including the eraser icon 60 in sequence from the lower layer of the projection image. It should be noted that the arrow V represents an eye direction of the user. In other words, the drawing mode controller 178 displays the drawn image 70 in the projection area R, and displays the eraser icon 60 in the projection area R using the drawn image 70 as a background.

When the pointer 20 touches the projection area R, the drawing mode controller 178 performs a contact determination in sequence from a layer as an upper layer. Therefore, when the pointer 20 makes contact with a position not included in the display area of the eraser icon 60, the drawing mode controller 178 determines the contact as the drawing instruction to the drawn image 70 arranged in the second layer L2. Further, when the pointer 20 makes contact with the display area of the eraser icon 60, the drawing mode controller 178 determines the contact as the selection instruction of the eraser icon 60 arranged in the third layer L3.

It should be noted that the mode selector 50 can be arranged in the third layer L3 as the same layer as the eraser icon 60, or can also be arranged in a layer not shown disposed at the upper layer side of the third layer L3. Further, it is assumed that the background image is a colorless image in the present embodiment, but it may be possible to designate the color of the background image, or to designate an arbitrary image as the background image. Further, a color which can easily be discriminated from the background image as the display color of the eraser icon 60 may be used. For example, when it is difficult to discriminate the color of the background image and the color of the eraser icon 60 from each other, it is possible to automatically change the display color of the eraser icon 60 to the color which can easily be discriminated from the background image.

Figure 7:
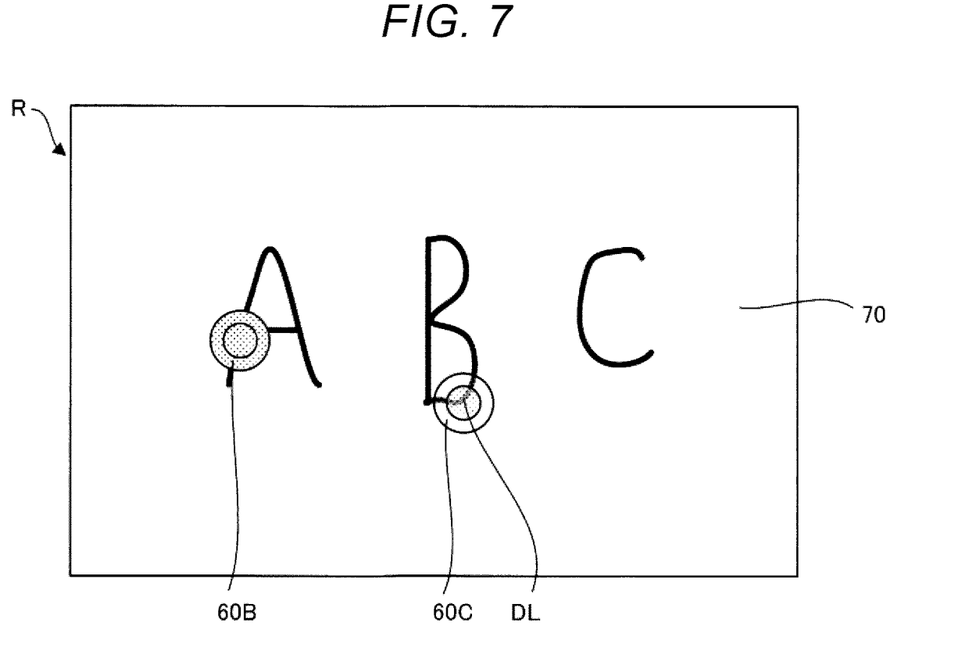
FIG. 7 is a diagram schematically showing when the eraser icon has permeability.

Further, it is possible for the eraser icon 60 to have permeability with respect to a layer as a lower layer. FIG. 7 is a diagram schematically showing the case where the eraser icon 60 has the permeability. An eraser icon 60B shown in FIG. 7 is an example of the case where the permeability is not provided. The drawn line DL located at a position overlapping the display area of the eraser icon 60B is hidden by the eraser icon 60B, and a part of "A" drawn cannot visually be recognized. In contrast, an eraser icon 60C shown in FIG. 7 is an example of the case where the permeability is provided. The drawn line DL located at a position overlapping the display area of the eraser icon 60C is displayed through the eraser icon 60C, and thus, the whole of "B" drawn is made visible.

When the eraser icon 60 does not have the permeability, and a part of the drawn image 70 is completely hidden as in the case of, for example, the eraser icon 60B, it is necessary for the user to move the eraser icon 60 as needed. In contrast, when the eraser icon 60 has the permeability, even when the eraser icon 60 and the drawn image 70 overlap each other, it is possible for the user to figure out the shape of the drawn line DL. Thus, it is possible to prevent the visibility of the drawn image 70 from being degraded by the eraser icon 60, and thus, further enhance the usability of the eraser icon 60.

D-2: Trajectory of Contact Position of Pointer 20

Then, a method of detecting a trajectory of the contact position of the pointer 20 will be described. The drawing mode controller 178 continuously detects the contact position of the pointer 20 to detect the trajectory of the contact position of the pointer 20 in the projection area R during a period from when the pointer 20 makes contact with the projection area R to when the pointer 20 is separated therefrom. More particularly, the drawing mode controller 178 analyzes the latest infrared light imaging datum every time the infrared light imaging datum is generated to determine whether or not the infrared light is included in the latest infrared light imaging datum. When the infrared light is included in the infrared light imaging datum, the drawing mode controller 178 detects a position H of the infrared light on the infrared light imaging datum, and further, converts the position H into a contact position Ha on the frame memory using the calibration datum.

Hereinafter, when the positions H in the infrared light imaging data and the contact positions Ha obtained by converting the positions H are each discriminated from each other, there are used the description of the position H (n) and the contact position Ha(n). It is assumed that n is identification information for identifying the generation timing of the infrared light imaging datum, and takes values of contiguous integers. One position H is obtained from one infrared light imaging datum, and one contact position Ha corresponding to the position H is obtained. Therefore, n also functions as identification information for identifying the contact position Ha.

Figure 14:
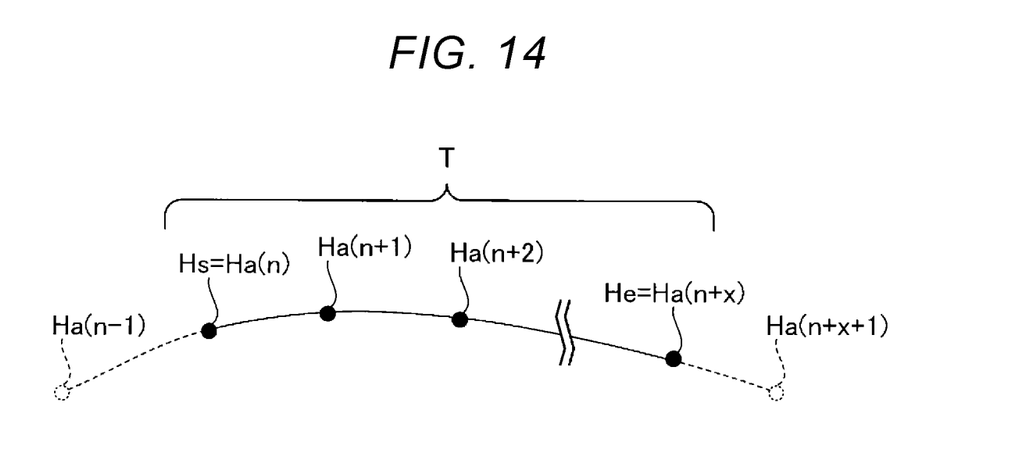
FIG. 14 is a diagram schematically showing a trajectory of a contact position of the pointer.

FIG. 14 is a diagram schematically showing a trajectory of the contact position of the pointer 20. The trajectory T of the contact position of the pointer 20 includes a starting point Hs and an ending point He. When the latest contact position Ha(n) is detected, the drawing mode controller 178 sets the latest contact position Ha(n) as the starting point Hs of the movement trajectory when the infrared light is not detected in the infrared light imaging datum generated last time, namely when the contact position Ha(n−1) does not exist. The drawing mode controller 178 associates each of the contact positions Ha(n+1), Ha(n+2), . . . based on the infrared light imaging data subsequently generated with the previous contact position Ha in sequence to generate the trajectory T.

Further, when the detection of the infrared light in the infrared light imaging datum stops, the drawing mode controller 178 sets the contact position Ha detected lastly as the ending point He of the movement trajectory. In the example shown in FIG. 14, the contact position is not detected after the contact position Ha(n+x). For example, the contact position Ha(n+x+1) is not detected. Therefore, the contact position Ha(n+x) becomes the ending point He of the trajectory T.

D-3: Details of Drawing Operation

In the drawing mode, it is possible for the user to add drawing to the drawn image 70 by moving the pointer 20 while making the pointer 20 have contact with the projection area R. In other words, the drawing mode controller 178 displays an image based on the trajectory T of the contact position of the pointer 20 as the drawn image 70. More particularly, the drawn image 70 is an image based on the trajectory of the contact position when the starting point of the trajectory of the contact position of the pointer 20 is not included in the display area of the erase icon 60.

Here, the processing to be executed by the drawing mode controller 178 defers by whether or not the starting point Hs of the contact position of the pointer 20 is included in the display area of the eraser icon 60.

1. When Starting Point Hs is not Included in Display Area of Eraser Icon 60

When the starting point Hs is not included in the display area of the eraser icon 60, the drawing mode controller 178 makes the projecting unit 14 project the image showing the drawn line DL corresponding to the trajectory T of the pointer 20. In other words, a normal drawing process is performed. It is possible to determine whether or not the starting point Hs is included in the display area of the eraser icon 60 based on, for example, whether or not the starting point Hs is located in a range of within a radius of r2 from the position of the central point O of the eraser icon 60 on the frame memory.

When the starting point Hs is not included in the display area of the eraser icon 60, the drawing mode controller 178 disposes a dot at the contact position Ha every time the contact position Ha is detected. A central position of this dot is the contact position Ha, and a diameter of this dot is a length corresponding to a drawing thickness determined in advance. The drawing thickness can be designated by the user in, for example, a setting screen in the drawing mode. The thicker the drawing thickness is, the larger the diameter of the dot becomes.

Further, the drawing mode controller 178 adds a coupling line for connecting a dot of the previous contact position Ha and a dot of the latest contact position Ha to each other to the drawn image 70 every time the dot is disposed. The coupling line has the same width as the diameter of the dot, and filled with the same color as the color of the dot. In other words, when the contact positions Ha are continuously detected, the user continuously performs the drawing, and therefore, the drawing mode controller 178 adds the coupling lines so that the drawn image 70 shows the line connecting the contact positions Ha.

The drawing mode controller 178 supplies the projecting unit 14 with the image datum of the latest drawn image 70 and the image datum of the eraser icon 60. The projecting unit 14 projects the image represented by the image datum of the latest drawn image 70 and the image datum of the eraser icon 60 on the projection area R. It should be noted that when the contact position Ha overlaps the display area of the eraser icon 60 during the drawing, the drawing mode controller 178 does not perform the selection of the eraser icon 60, but continues the drawing on the second layer L2.

2. When Starting Point Hs is Included in Display Area of Eraser Icon 60

When the starting point Hs is included in the display area of the eraser icon 60, the drawing mode controller 178 establishes the state in which the eraser icon 60 is selected with the pointer 20. On this occasion, it is possible to provide the eraser icon 60 with a visual effect so that the user can figure out the fact that there is established the state in which the eraser icon 60 is selected. As the visual effect, it is possible to, for example, change the color of the eraser icon 60, or slightly move the eraser icon 60 upward on the projection area R in imitation of an appearance of lifting the eraser.

When the pointer 20 moves on the projection area R in the state in which the eraser icon 60 is selected, the drawing mode controller 178 moves the display position of the eraser icon 60 on the first layer L1 in accordance with the movement of the pointer 20. When the eraser icon 60 moves, presence or absence of the deletion of the drawn line DL differs in accordance with whether the starting point Hs is included in the display area of the second portion 64 or the starting point Hs is included in the display area of the first portion 62.

2-1. When Starting Point Hs is Included in Display Area of Second Portion 64 of Eraser Icon 60

Figure 8:
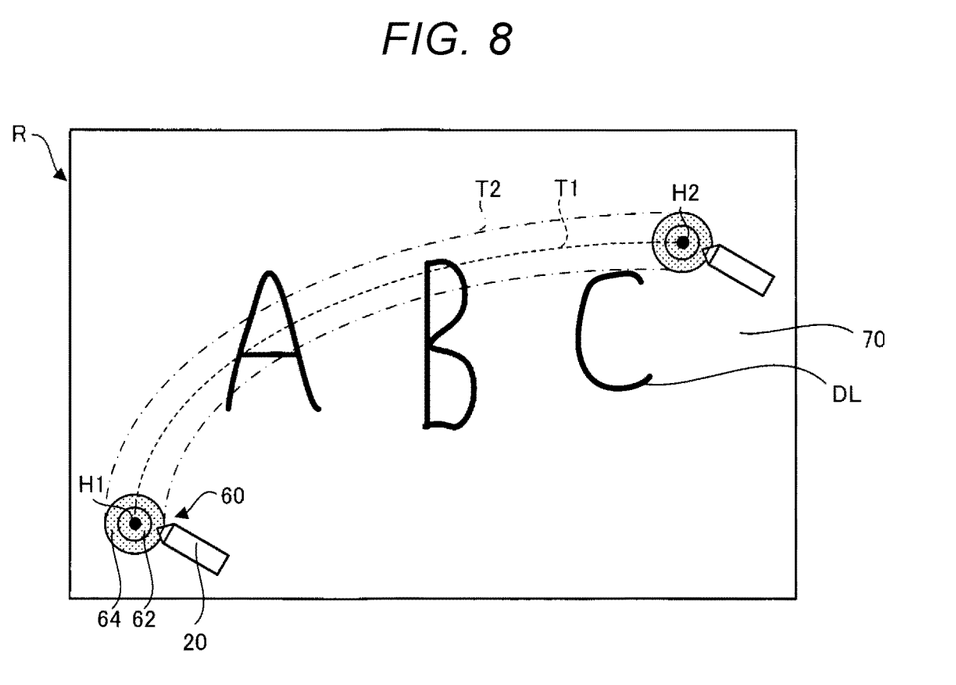
FIG. 8 is a diagram schematically showing a drawn image when a starting point is included in a display area of a second portion.

FIG. 8 is a diagram schematically showing the drawn image 70 when the starting point Hs is included in the display area of the second portion 64. In FIG. 8, there is illustrated when the eraser icon 60 is moved from a position H1 located in a lower left area to a position H2 located in an upper right area along a trajectory T1. It should be noted that the trajectory T1 represented by a dotted line is the movement trajectory of the central point O of the eraser icon 60, and an area T2 represented by dashed-dotted lines is an area which the display area of the eraser icon 60 overlaps during the movement from the position H1 to the position H2.

When the starting point Hs is included in the display area of the second portion 64, the drawing mode controller 178 does not perform the erasure of the drawn image 70, but executes only the movement of the display position of the eraser icon 60. More particularly, when the starting point Hs is included in the display area of the eraser icon 60, the drawing mode controller 178 changes the display position of the eraser icon 60 in accordance with the contact position Ha every time the contact position Ha is detected. On this occasion, it is possible to determine the display position of the eraser icon 60 so as keep the relative positional relationship between the central point O of the eraser icon 60 and the contact position Ha in the starting point Hs.

2-2. When Starting Point is Included in Display Area of First Portion 62 of Eraser Icon 60

Figure 9:
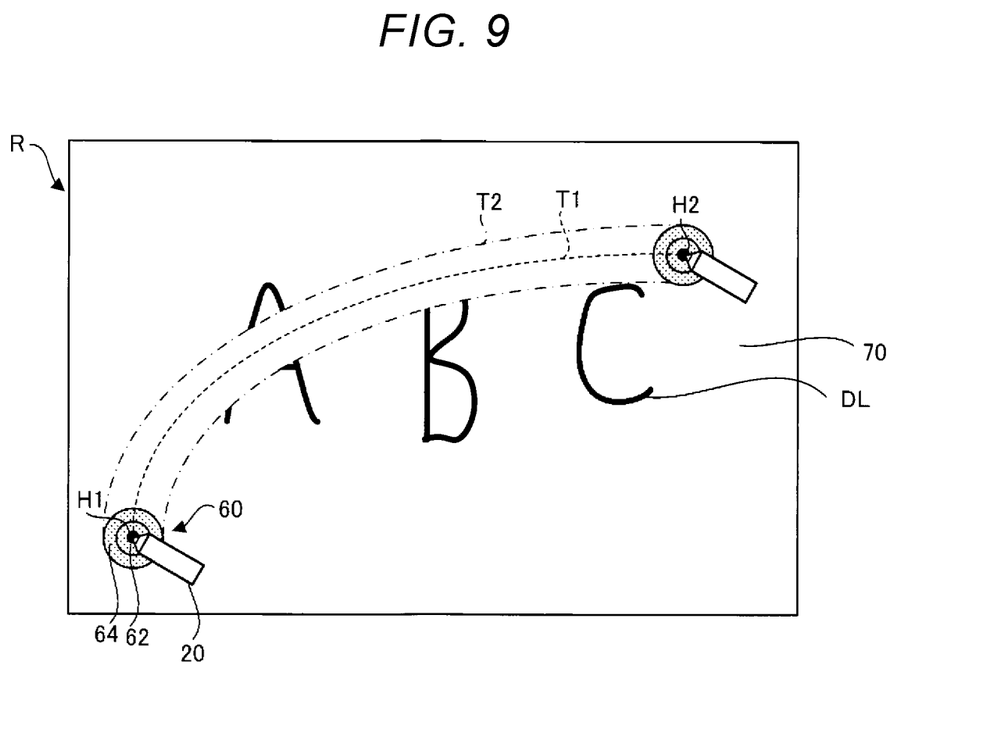
FIG. 9 is a diagram schematically showing the drawn image when a starting point is included in a display area of a first portion.

FIG. 9 is a diagram schematically showing the drawn image 70 when the starting point Hs is included in the display area of the first portion 62. Similarly to FIG. 8, FIG. 9 also illustrate when the eraser icon 60 is moved from the position H1 located in the lower left area to the position H2 located in the upper right area along the trajectory T1. When the starting point Hs is included in the first portion 62, the drawing mode controller 178 moves the display position of the eraser icon 60, and at the same time, erases a portion of the drawn image 70 overlapping the movement trajectory of the eraser icon 60. In the example shown in FIG. 9, the drawn lines DL located in the area T2 which the display area of the eraser icon 60 overlaps when moving from the position H1 to the position H2 are erased. By erasing the drawn lines DL in the area where the eraser icon 60 passes as described above, it is possible to realize an operation feeling as if the drawn lines DL were erased using an eraser.

Specifically, when the starting point Hs of the trajectory T of the contact position Ha is included in an area where the eraser icon 60 is displayed in the projection area R, the drawing mode controller 178 moves the display position of the eraser icon 60 in the projection area R along the trajectory T of the contact position Ha. On this occasion, when the starting point Hs is included in the area where the first portion 62 of the eraser icon 60 is displayed, the drawing mode controller 178 provides a drawing effect to a portion of the drawn image 70 overlapping the movement trajectory of the eraser icon 60. The drawing effect in the present embodiment means erasing the portion of the drawn image 70 overlapping the movement trajectory of the eraser icon 60. Further, when the starting point Hs is included in the area where the second portion 64 of the eraser icon 60 is displayed, the drawing mode controller 178 keeps the display of a portion of the drawn image 70 overlapping the movement trajectory of the eraser icon 60.

By making it possible to switch presence or absence of the erasure of the drawn image 70 in accordance with the contact position to the eraser icon 60 as described above, it is possible to efficiently erase only the desired area. For example, there is considered when it is desired to erase only the character "C" located in a right portion of the projection area R. First, as shown in FIG. 8, the user moves the eraser icon 60 located at the position H1 in a left portion of the projection area R to the position H2 in the right portion while touching the second portion 64. In this movement, the drawn image 70 is not erased. After the user moves the eraser icon 60 to the position H2, the user shifts the touch position to the first portion 62, and then moves the eraser icon 60 so as to overlap the drawn line DL constituting the character "C." Due to this movement, the drawn line DL constituting the character "C" is erased.

By using the pointer 20 and the eraser icon 60, it is possible to realize an operation feeling as if drawing were performed using an analog pencil and an analog eraser. Thus, it is possible for the user who is not used to, for example, an operation of digital equipment to easily perform drawing in an easy-to-understand manner. Further, since the eraser icon 60 is continuously displayed in the projection area R during the drawing mode, it is possible to reduce the number of operations to increase the efficiency of the drawing operation compared to when invoking the eraser function using, for example, a toolbar every time the eraser function is used.

It should be noted that the drawn image 70 in the area T2 which the display area of the eraser icon 60 overlaps is erased in the example shown in FIG. 9, but this is not a limitation, and it is possible to erase the drawn image 70 in, for example, a range with a predetermined width centering on the trajectory T1 of the eraser icon 60. The predetermined width can be smaller than the diameter of the eraser icon 60, or can also be larger than the diameter thereof. The diameter of the eraser icon 60 is twice as large as the radius r2 of the second circle S2 shown in FIG. 6A. Similarly to the drawing thickness, it is possible to arrange that the predetermined width can be designated by the user in, for example, the setting screen in the drawing mode.

Further, the timing at which the drawn image 70 is erased can be when, for example, the eraser icon 60 and the drawn image 70 overlap each other, or can also be when the eraser icon 60 moves to a position where the eraser icon 60 and the drawn image 70 do not overlap each other after once the eraser icon 60 and the drawn image 70 have overlapped each other. Further, the timing at which the drawn image 70 is erased can be when, for example, the eraser icon 60 stops moving, or can also be when the pointer 20 is separated from the projection area R.

D-4: Flowchart

Figure 10:
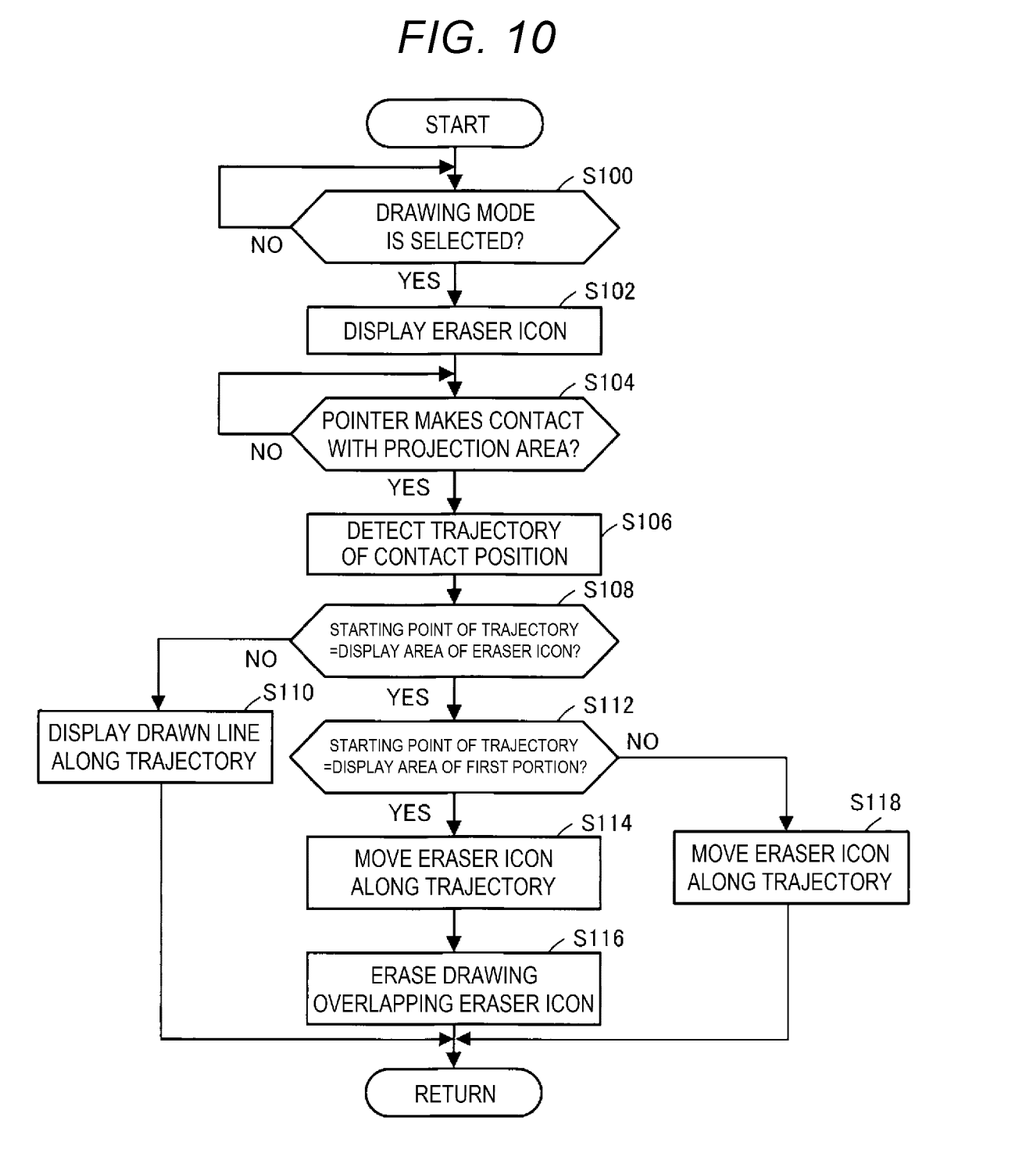
FIG. 10 is a flowchart showing a flow of an image processing method to be executed by a processor of the projector in accordance with a control program.

FIG. 10 is a flowchart showing a flow of an image processing method to be executed by the processor 17 of the projector 10 in accordance with the control program 162. The processor 17 functions as the drawing mode controller 178 to thereby execute the steps shown in FIG. 10.

The processor 17 waits (NO in the step S100) until the drawing mode of the projector 10 is selected. The selection of the drawing mode is performed by the user touching the drawing mode icon 52 of the mode selector 50. When it has been detected that the drawing mode has been selected (YES in the step S100), the processor 17 displays (step S102) the eraser icon 60 in the projection area R.

The processor 17 detects (step S104) whether or not the pointer 20 makes contact with the projection area R based on the infrared light imaging datum taken by the camera 15. When the pointer 20 does not have contact (NO in the step S104), the processor 17 repeats the detection until the pointer 20 makes contact. When the pointer 20 makes contact (YES in the step S104), the processor 17 detects (step S106) the trajectory T of the contact position Ha of the pointer 20. In other words, when the infrared light shows in the infrared light imaging datum, the processor 17 detects the position H in the infrared light imaging datum, and converts the position H into the contact position Ha on the frame memory using the calibration datum. By continuously detecting the contact position Ha, the trajectory T of the contact position Ha is obtained.

When the starting point Hs of the trajectory T is not included in the display area of the eraser icon 60 (NO in the step S108), the processor 17 displays (step S110) the drawn line DL along the trajectory T during a period in which the pointer 20 has contact with the projection area R. The drawn lines DL constitute the drawn image 70. In contrast, when the starting point Hs of the trajectory T is included in the display area of the eraser icon 60 (YES in the step S108), the processor 17 determines (step S112) whether or not the starting point Hs is included in the display area of the first portion 62. When the starting point Hs is included in the display area of the first portion 62 (YES in the step S112), the processor 17 moves (step S114) the display position of the eraser icon 60 along the trajectory T during the period in which the pointer 20 has contact with the projection area R. Further, the processor 17 erases (step S116) the portion of the drawn image 70 overlapping the movement trajectory of the eraser icon 60.

Further, in the step S112, when the starting point Hs is not included in the display area of the first portion 62 (NO in the step S112), namely when the starting point Hs is included in the display area of the second portion 64, the processor 17 moves (step S118) the display position of the eraser icon 60 along the trajectory T during the period in which the pointer 20 has contact with the projection area R. On this occasion, the display of a portion of the drawn image 70 overlapping the movement trajectory of the eraser icon 60 is kept unchanged. Subsequently, the process returns to the step S100.

D-5: Display Position of Eraser Icon 60

As described above, the display position of the eraser icon 60 is changed so as to follow the movement of the pointer 20, but it is possible to set a reference display position to be the reference of the display position of the eraser icon 60 on the projection area R. In this case, an initial display position of the eraser icon 60 when, for example, the projector 10 is switched to the drawing mode is defined as the reference display position. In the following description, the position H1 of the eraser icon 60 in FIG. 4 is defined as the reference display position. The reference display position is an example of a first position.

When setting the reference display position, it is possible for the drawing mode controller 178 to return the display position of the eraser icon 60 to the reference display position when the pointer 20 is separated from the projection area R during the movement of the eraser icon 60 and the contact position Ha is no longer detected. Specifically, as shown in FIG. 8 or FIG. 9, for example, it is possible to arrange that the display position of the eraser icon 60 is returned to the position H1 when the pointer 20 is separated from the projection area R after the eraser icon 60 is moved from the position H1 as the reference display position to the position H2.

When the contact position Ha is no longer detected means when the ending point He of the trajectory T is fixed. On this occasion, the display position of the eraser icon 60 becomes the ending point He of the trajectory T. The ending point He is an example of a second position. By returning the display position of the eraser icon 60 to the reference display position instead of keeping the display position to the ending point He when the pointer 20 is separated from the projection area R, the display position of the eraser icon 60 in the projection area R is decided. Thus, it is possible for the user to easily figure out the display position of the eraser icon 60, and to promptly use the eraser icon 60 when the user wants to use the eraser icon 60.

On this occasion, it is possible for the drawing mode controller 178 to continue to display the eraser icon 60 at the ending point He until a predetermined time elapses after the pointer 20 is separated from the projection area R and the contact position Ha is no longer detected. When the predetermined time elapses, the drawing mode controller 178 sets the display position of the eraser icon 60 to the reference display position. Thus, it is possible to continuously display the eraser icon 60 in the vicinity of the pointer 20 when, for example, the pointer 20 is separated from the projection area R due to an operation failure, and when drawing and erasure are repeated at short intervals. Therefore, compared to an operation of immediately returning the eraser icon 60 to the reference display position when the pointer 20 is separated from the projection area R, it is possible to increase the efficiency of the operation using the eraser icon 60.

In other words, displaying the eraser icon 60 includes displaying the eraser icon 60 at the reference display position in the projection area R, and moving the display position of the eraser icon 60 includes moving the eraser icon 60 from the reference display position to the ending point He. It is possible for the drawing mode controller 178 to continue the display of the eraser icon 60 at the ending point He when the contact of the pointer 20 to the area where the eraser icon 60 is displayed is released at the ending point He. On this occasion, it is possible for the drawing mode controller 178 to display the eraser icon 60 at the reference display position when a predetermined time elapses from when the contact of the pointer 20 to the area where the eraser icon 60 is displayed is released at the ending point He.

It should be noted that it is possible for the drawing mode controller 178 to return the display position of the eraser icon 60 to the reference display position immediately when the pointer 20 is separated from the projection area R. In this case, it has the same meaning as the fact that the predetermined time described above is approximately zero.

Further, it is possible for the drawing mode controller 178 to keep the display position of the eraser icon 60 at the ending point He even after the pointer 20 is separated from the projection area R. On this occasion, the eraser icon 60 continues to be displayed at the ending point He until the pointer 20 makes contact with the eraser icon 60 next time, and the eraser icon 60 is used. In other words, when continuing to display the eraser icon 60 at the ending point He, it is possible for the drawing mode controller 178 to continue to display the eraser icon 60 at the ending point He until the pointer 20 makes contact with the area where the eraser icon 60 is displayed. Thus, it is possible to continuously display the eraser icon 60 at an arbitrary position. For example, by displaying the eraser icon 60 in the vicinity of the position where the user performs drawing, it is possible for the user to efficiently perform the drawing operation.

E: Modified Examples

Each of the aspects illustrated hereinabove can variously be modified. Some aspects of the specific modifications which can be applied to each of the aspects described above will be illustrated below. Two or more aspects arbitrarily selected from the following illustrations can properly be combined with each other unless conflicting with each other.

E-1: Modified Example 1

The embodiment described above is an embodiment related to the eraser icon 60 for erasing the drawn image 70. This is not a limitation, and it is possible for the icon having the first portion and the second portion to provide other drawing effects to the display image.

Figure 11:
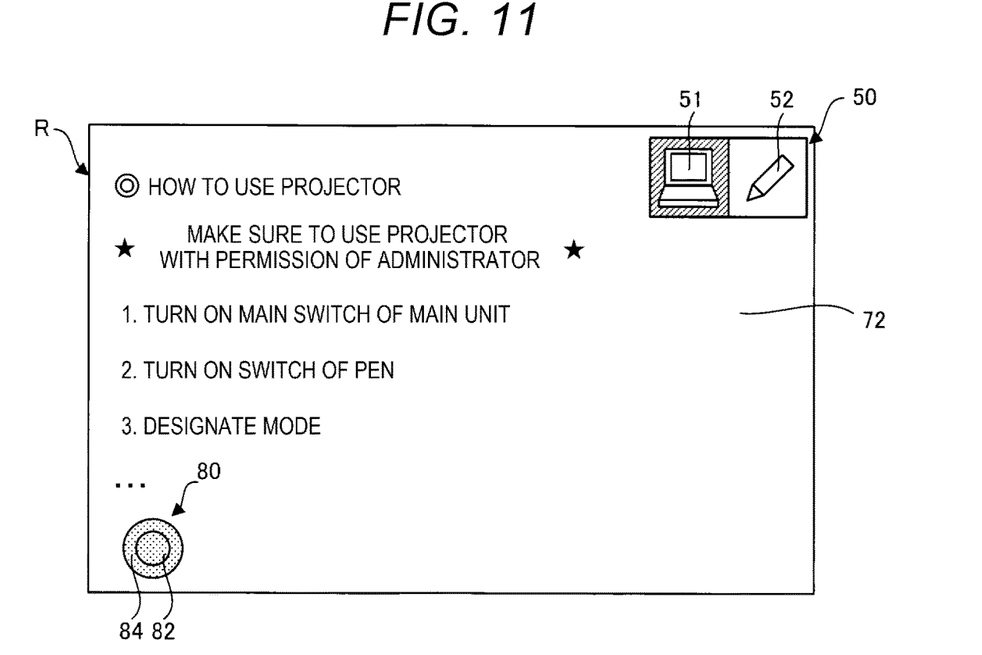
FIG. 11 is a diagram showing an example of display of a projection area related to Modified Example 1.

FIG. 11 is a diagram showing an example of display of a projection area R in Modified Example 1. In FIG. 11, in the projection area R, there are displayed the mode selector 50 in the state in which the PC mode icon 51 is selected, the display image 72 including document information, and a highlighter icon 80. During the selection of the PC mode, for example, the processor 17 functions as a PC mode controller 176 to thereby execute a variety of types of processing.

The display image 72 is an image obtained by developing the datum stored in the computer P. In the example shown in FIG. 11, there is displayed the document information related to the usage of the projector as the display image 72. The highlighter icon 80 is a tool to be used when the user highlights an arbitrary area in the display image 72. In the present embodiment, a highlighting line is drawn with a fluorescent color having permeability in the place where the highlighter icon 80 has passed. Thus, the area of the display image 72 overlapping the place where the highlighter icon 80 has passed is visually recognized distinctly from other areas. It should be noted that it is possible to arrange that the highlighting line drawn with the highlighter icon 80 disappears when a predetermined time elapses, or is gradually lightened in color with time. In other words, in Modified Example 1, the display image 72 is an example of the first image, and the highlighter icon 80 is an example of the second image. Similarly to the embodiment described above, the highlighter icon 80 is arranged in the third layer L3, the display image 72 is arranged in the second layer L2 at the lower layer side of the third layer L3.

The highlighter icon 80 can always be displayed in the projection area R during the designation of the PC mode. Thus, it is possible for the user to promptly use the highlighter icon 80 as needed without performing, for example, an operation for instructing a start of display of the highlighter icon 80, and thus, it is possible to enhance the convenience in the operation using the display image 72. It should be noted that it is possible to display the highlighter icon 80 in the drawing mode.

The highlighter icon 80 will be described in more detail. When the starting point Hs of the trajectory T of the pointer 20 is included in the display area of the highlighter icon 80, the PC mode controller 176 establishes the state in which the highlighter icon 80 is selected with the pointer 20. When the pointer 20 moves on the projection area R in the state in which the highlighter icon 80 is selected, the PC mode controller 176 moves the highlighter icon 80 on the third layer L3 in accordance with the movement of the pointer 20. When the highlighter icon 80 moves, presence or absence of the display of the highlighting line differs in accordance with whether the starting point Hs of the movement trajectory T is included in the display area of the second portion 84 or the starting point Hs is included in the display area of the first portion 82.

Figure 12:
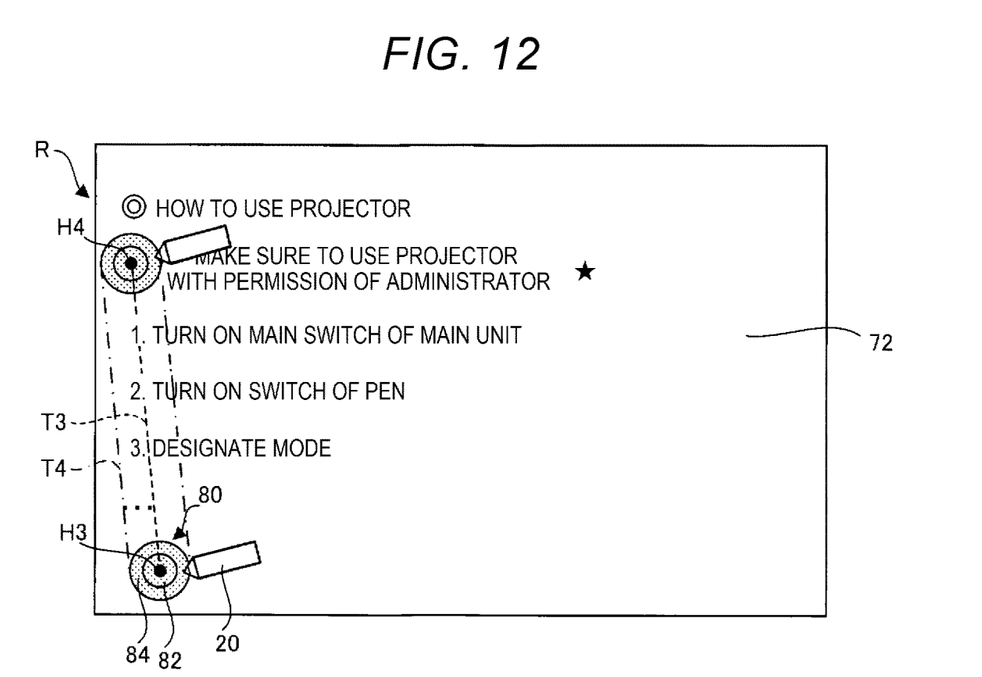
FIG. 12 is a diagram schematically showing a display image when a starting point is included in a display area of a second portion.

FIG. 12 is a diagram schematically showing the display image 72 when the starting point Hs is included in the display area of the second portion 84. FIG. 12 illustrates the case of moving the highlighter icon 80 from a point H3 located in a lower left area to a point H4 located in an upper left area. It should be noted that a trajectory T3 represented by a dotted line is a movement trajectory of the central point O of the highlighter icon 80, and an area T4 represented by a dashed-dotted line is an area overlapping the display area of the highlighter icon 80. When the starting point Hs is included in the display area of the second portion 84, the PC mode controller 176 does not perform the display of the highlighting line, but executes only the movement of the display position of the highlighter icon 80.

Figure 13:
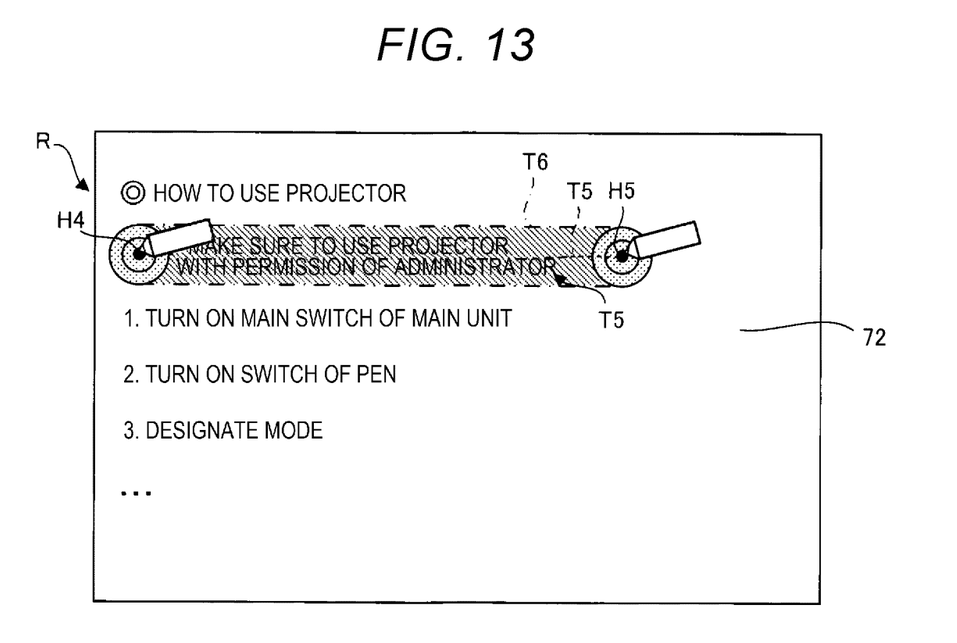
FIG. 13 is a diagram schematically showing the display image when the starting point is included in a display area of a first portion.

FIG. 13 is a diagram schematically showing the display image 72 when the starting point Hs is included in the display area of the first portion 82. FIG. 13 illustrates the case of moving the highlighter icon 80 from the point H4 located in the upper left area to a point H5 located in an upper right area. It should be noted that a trajectory T5 represented by a dotted line is a movement trajectory of the central point O of the highlighter icon 80, and an area T6 represented by a dashed-dotted line is an area overlapping the display area of the highlighter icon 80.

When the starting point Hs is included in the display area of the first portion 82, the PC mode controller 176 moves the display position of the highlighter icon 80, and at the same time, displays a highlighting line L in a portion of the display image 72 overlapping the movement trajectory of the highlighter icon 80. In the example shown in FIG. 13, the area T6 which the display area of the highlighter icon 80 overlaps during a period in which the highlighter icon 80 moves from the point H4 to the point H5 is displayed with the fluorescent color to form a highlighting line FL. By displaying the highlighting line in the area in which the highlighter icon 80 has passed, it is possible to realize an operation feeling as if highlighting line were drawn using a highlighter pen.

It should be noted that the area T6 which the display area of the highlighter icon 80 overlaps is displayed with the fluorescent color to form the highlighting line in the example shown in FIG. 13, but this is nota limitation, and it is possible to draw a highlighting line in, for example, a range with a predetermined width centering on the trajectory T5 of the highlighter icon 80. The predetermined width can be smaller than the diameter of the highlighter icon 80, or can also be larger than the diameter thereof. The diameter of the highlighter icon 80 means a diameter of a circle constituting the second portion 84 of the highlighter icon 80. Similarly to the drawing thickness, it is possible to arrange that the predetermined width can be designated by the user in, for example, the setting screen in the PC mode.

Further, in the PC mode, it is possible to arrange that when moving the pointer 20 while making the pointer 20 have contact with the portion of the projection area R other than the highlighter icon 80, the display image 72 scrolls in the moving direction.

E-2: Modified Example 2

In the embodiment described above, it is assumed that the position of the pointer 20 is detected using the infrared light, but the detection method of the position of the pointer 20 is not limited thereto, and a variety of methods known to the public can be applied. For example, it is possible for the detection device for detecting the position of the pointer 20 to irradiate the pointer 20 with light having a predetermined wavelength, and receive the light reflected by the pointer 20 to thereby detect the position of the pointer 20. The detection device can be a device for detecting a position where the light is blocked by the pointer 20 using a device for emitting the infrared light or a laser source, and a light receiving device. When using these methods, the pointer 20 can be a finger of the user.

What is claimed is:

1. An image processing method comprising:
 detecting a trajectory of contact positions of a pointer on a display surface in a period from when the pointer makes contact with the display surface to when the pointer is separated from the display surface;
 displaying a first image on the display surface;
 displaying a second image having a first portion and a second portion on the display surface using the first image as a background;
 moving a display position of the second image on the display surface along the trajectory of the pointer when a starting point of the trajectory of the pointer is included in an area of the display surface on which the second image is displayed;
 providing a drawing effect to a portion of the first image overlapping a trajectory of the second image when the starting point is included in an area in which the first portion is displayed in the moving the display position of the second image; and
 keeping display of the portion of the first image overlapping the trajectory of the second image when the starting point is included in an area in which the second portion is displayed in the moving the display position of the second image, wherein
 the first image is an image based on the trajectory of the contact position when the starting point is not included in the area in which the second image is displayed, and
 the drawing effect is erasing the portion of the first image.

2. The image processing method according to claim 1, wherein
 displaying the second image includes continuing to display the second image on the display surface in a drawing mode in which the trajectory of the pointer is displayed as the first image.

3. The image processing method according to claim 1, wherein
 displaying the second image includes displaying the second image at a first position on the display surface,
 moving the display position of the second image includes moving the second image from the first position to a second position on the display surface where a contact of the pointer to the area in which the second image is displayed is released, and
 continuing to display the second image at the second position.

4. The image processing method according to claim 3, further comprising:
 displaying the second image at the first position when a time elapses from when the contact of the pointer to the area in which the second image is displayed is released at the second position.

5. The image processing method according to claim 3, wherein
 continuing to display the second image at the second position includes continuing to display the second image at the second position until the pointer makes contact with the area in which the second image is displayed.

6. The image processing method according to claim 1, wherein
 in the second image, the first portion is surrounded by the second portion.

7. An image processing device comprising:
 a display device;
 a detection device configured to detect information related to a position of a pointer; and
 at least one processing device programmed to execute
 detecting a trajectory of contact positions of the pointer on a display surface in a period from when the pointer makes contact with the display surface to when the pointer is separated from the display surface based on an output of the detection device, displaying a first image on the display surface using the display device, displaying, using the display device, a second image having a first portion and a second portion on the display surface using the first image as a background, moving a display position of the second image on the display surface along the trajectory of the pointer when a starting point of the trajectory of the pointer is included in an area of the display surface on which the second image is displayed, providing a drawing effect to a portion of the first image overlapping a trajectory of the second image when the starting point is included in an area in which the first portion is displayed in the moving the display position of the second image, and keeping display of the portion of the first image overlapping the trajectory of the second image when the starting point is located in an area in which the second portion is displayed in the moving the display position of the second image, wherein the first image is an image based on the trajectory of the contact position when the starting point is not included in the area in which the second image is displayed, and the drawing effect is erasing the portion of the first image.

* * * * *